United States Patent [19]

Klages

[11] Patent Number: 5,060,750
[45] Date of Patent: Oct. 29, 1991

[54] AXLE SHAFT RETENTION STRUCTURE
[75] Inventor: Corwin L. Klages, Cedar Falls, Iowa
[73] Assignee: Deere & Company, Moline, Ill.
[21] Appl. No.: 660,161
[22] Filed: Feb. 21, 1991

Related U.S. Application Data

[63] Continuation of Ser. No. 398,019, Aug. 24, 1989, abandoned.
[51] Int. Cl.⁵ .............................................. B60K 17/30
[52] U.S. Cl. ..................................... 180/257; 180/380; 180/385; 384/903
[58] Field of Search ............... 180/380, 258, 383, 385, 180/257; 384/903, 906; 277/136, 137, 181; 301/124 H

[56] References Cited

U.S. PATENT DOCUMENTS

| | | | |
|---|---|---|---|
| 2,666,676 | 3/1952 | Rhine | 384/906 |
| 3,623,782 | 11/1971 | Nakanishi | 384/906 |
| 4,300,651 | 11/1981 | Krude | 180/385 |
| 4,671,681 | 6/1987 | Larou | 384/906 |
| 4,693,699 | 9/1987 | Gergerson | 464/133 |

OTHER PUBLICATIONS

Workshop Manual for Fiat Trattori 1180-1280-1380-1580-1880, Section 402, p. 3.
Drawing Marked, "JD Production", FIG. 4.

Primary Examiner—Kenneth R. Rice
Assistant Examiner—Anne Marie Boehler

[57] ABSTRACT

An axle shaft retention structure includes a retainer ring trapped between a shoulder on an axle shaft and the inner end of a hollow sleeve which is a part of a universal joint. The hollow sleeve is attached to the axle shaft by a snap ring. The retaining ring is provided with spherical slots which receive the spherical inner ends of retaining screws extending through the axle housing. The retaining screws nest into the spherical slots in the retaining ring inward against an internal shoulder on an axle housing. The shoulder on the axle housing and retaining screws limit both axial and rotary movement of the retainer ring. Thus, end play, which is detrimental to oil seal life, is limited to a minimum.

11 Claims, 2 Drawing Sheets

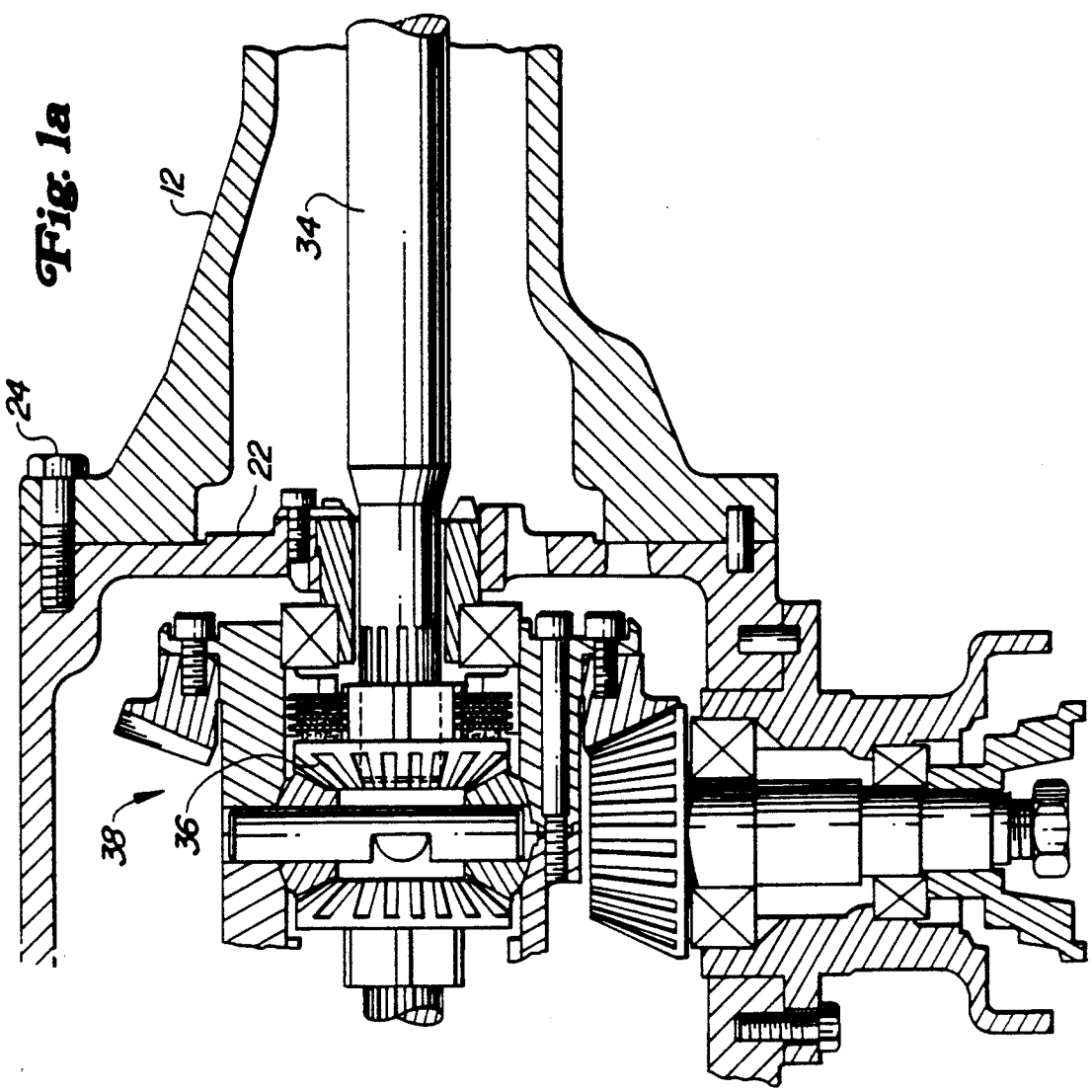
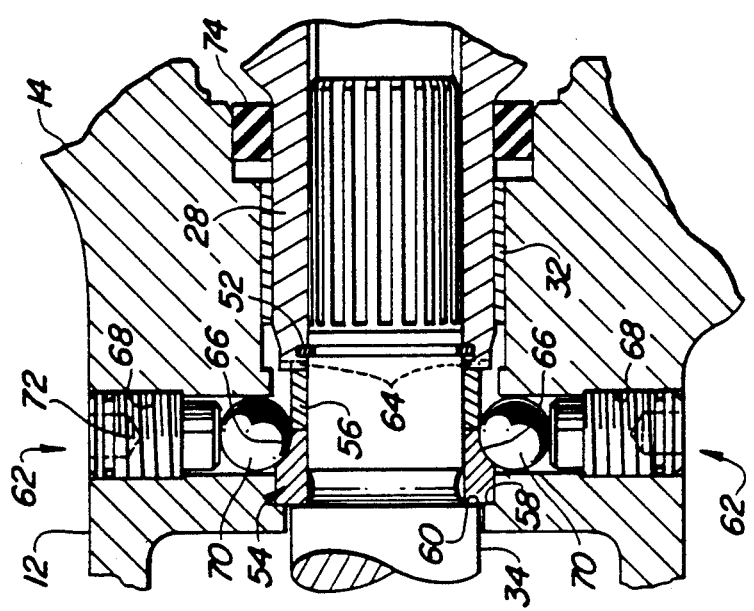

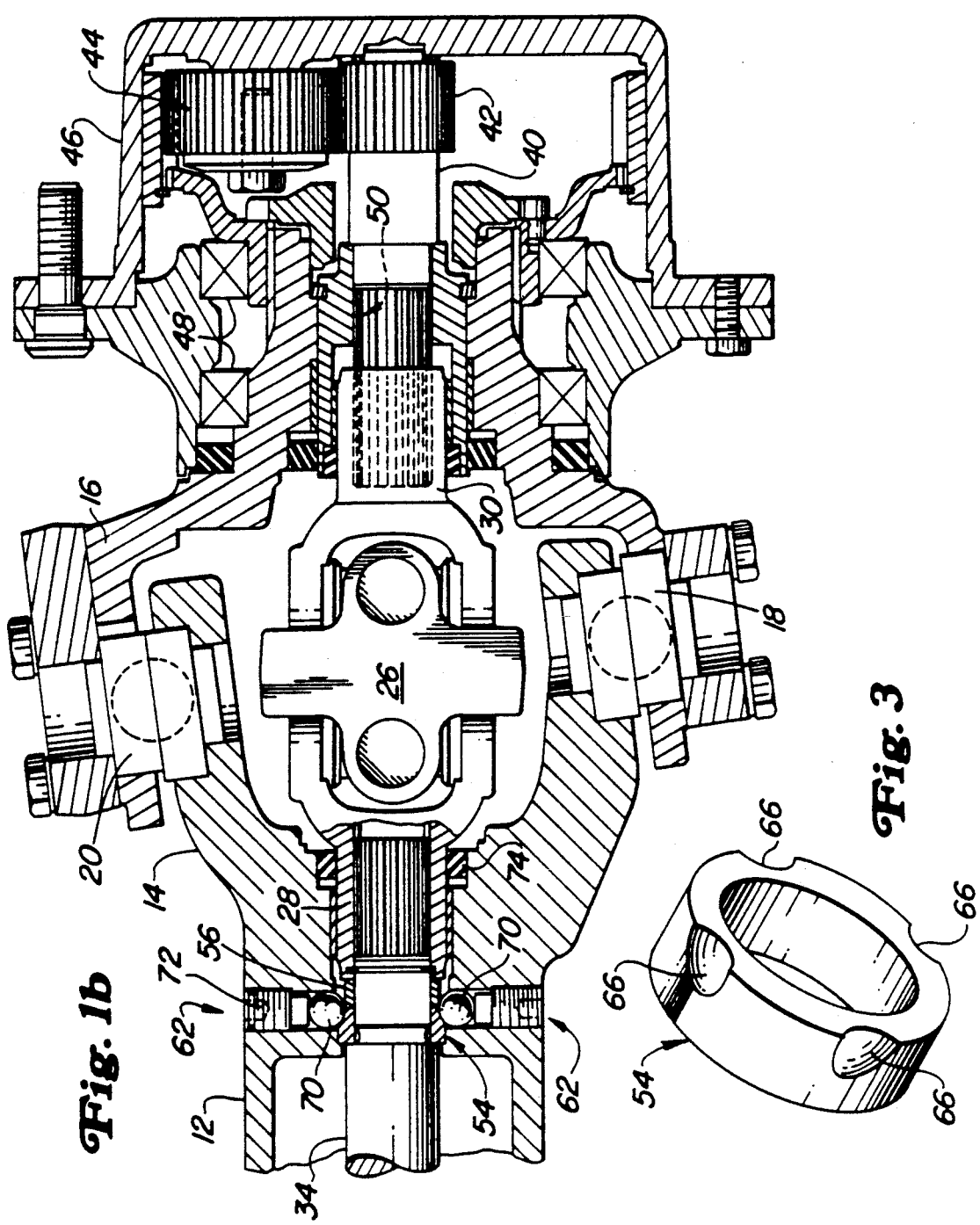

AXLE SHAFT RETENTION STRUCTURE

This application is a continuation of application Ser. No. 07/398,019, filed August 24, 1989 now abandoned.

BACKGROUND OF THE INVENTION

The present invention relates generally to structure for retaining an axle shaft within a housing and more particularly to structure for preventing axial movement of the shaft in a steerable axle where a double cardan constant velocity U-joint is used.

On steerable axles where a double cardan constant velocity U-joint is used, one end of the U-joint must be retained and the opposite end must have freedom for end play. This is because a characteristic of this type of joint is that as it moves through its operating angle, the length of the joint changes, resulting in reciprocating motion or "plunge" of one end of the joint as the axle is steered. It is not functional to allow the U-joint to float or in other words, fix both shaft ends with the U-joint not attached to either, since the U-joint can move off of the center of the steering axis. Therefore, it is necessary to fix or retain end play of either the inner or outer shaft along with one end of the U-joint.

In some applications, the shaft, inner or outer, which is allowed to plunge is important. For example, on a steerable mechanical front wheel drive axle with a limited slip differential, the plunge which can occur across the steering axis can be, depending upon the size of the unit, from 9mm to 10mm. If this plunge is allowed to occur on the inner part of the shaft, it can have a substantial effect on the limited slip action of the differential. Specifically, even though the inner shaft is free to slide within the limited slip unit, under load substantial friction between the unit and shaft would still cause excess friction between the disks during the shaft plunge. Therefore, it is extremely desirable that the inner shaft be held axially stationary with respect to the axial housing and that all plunge be taken on the outer side of the universal joint.

In holding the axle shaft against axial movement relative to the housing, it is also important that tolerances be held quite rigid since end play of 0.010" can be detrimental to an oil seal unless a special oil seal which can tolerate both axial and rotary movement is employed.

One design for preventing axial movement of the inner end of a drive shaft for a steerable mechanical front wheel drive axle is shown in U.S. Pat. No. 4,693,699 which issued on August 15, 1987 and is assigned to the assignee of the present application. In the design shown in that patent, the axle housing and yoke are made of separate pieces and are together. The inner axle shaft is provided with an annular groove and two half washers are positioned in the groove and held between the axle housing and yoke. In this manner, axial movement of the inner shaft is tightly controlled and all plunge created by the universal joint is taken on the outer shaft where a special oil seal arrangement is employed. The design shown in U.S. Pat. No. 4,693,699 adequately controlled the axial movement of the inner shaft, but created manufacturing problems due to difficulties in heat treating the inner shaft across the groove for the retention ring.

In a design similar to that shown in U.S. Pat. No. 4,693,699, the assignee of the present application eliminated the need for a groove for the two half washers by reducing the diameter of the shaft back to a shoulder so that the two half washers bore against the shoulder and against a sleeve trapped between the two half washers and the inner end of the universal joint stub shaft. Both the design shown in the U.S. Pat. No. 4,693,699 and that previously utilized by the assignee of the present application relied upon the axle housing and yoke being made of separate parts bolted together in order to place the two half washers on the shaft. In some applications, it is desirable for cost saving reasons, if for no other reason, to have the axle housing and yoke made of a single casting.

Another prior art design known to applicant utilized a single piece axle housing and yoke and held the inner shaft from axial movement. In this design the inner race of a ball bearing was captured between a shoulder on the shaft and a snap ring in a groove of the shaft. The outer race of the bearing was captured between two snap rings positioned in internal grooves of a ring. The ring was then held in a fixed position with respect to the axle housing by a dogpoint screw which was threaded through the axle housing into a groove or hole in the outside surface of the sleeve. While this design did utilize a single piece axle housing and yoke, the use of multiple snap rings to retain the roller bearing, and the roller bearing itself, provided too much end play between the axle and axle housing such that it was difficult to maintain a seal between the axle and axle housing.

SUMMARY OF THE INVENTION

The principle object of the present invention is to provide a retention structure for a rotary axle shaft which prevents axial movement of the shaft with respect to the axle housing.

A more specific object of the present invention is to provide an axle shaft retention structure for a steerable driven axle which prevents axial movement of the driven shaft relative to the axle housing.

The above objects are accomplished by trapping a shaft retainer ring between a shoulder on the axle shaft and the inner end of a hollow sleeve or stub shaft forming a part of a universal joint. The hollow sleeve is attached to the axle shaft by a snap ring. The retaining ring is provided with spherical slots which receive the spherical inner ends of retaining screws extending through the axle housing. The retaining screws nest into the spherical slots in the retaining ring and force the retaining ring inward against an internal shoulder on the axle housing. The shoulder on the axle housing and the retaining screws limit both axial and rotary movement of the retainer ring. Thus, end play, which is detrimental to oil seal life, is limited to a minimum.

The above objects and the structure of the invention will become apparent, along with various other objects and advantages of the invention, from a reading of the following detailed description of the invention when taken in conjunction with the accompanying drawing.

BRIEF DESCRIPTION OF THE DRAWING

In the drawing:

FIGS. 1a and 1b, taken together, are a sectional view of a steerable drive axle, from the differential to an outer planetary final drive, and incorporating the shaft retention structure of the present invention.

FIG. 2 is an enlarged view of a section of the left-hand end of FIG. 1b.

FIG. 3 is a perspective view of a retainer ring forming part of the present invention.

FIG. 4 is an elevational view of a modification of a portion of the invention.

DESCRIPTION OF PREFERRED EMBODIMENTS

The invention is shown in FIG. 1 in the context of a steerable drive axle assembly. This assembly includes an axle housing 12 which includes in integral yoke 14 at its outer end. Yoke 14 is pivotably connected to a knuckle 16 by kingpin assemblies 18 and 20. The inner end of axle housing 12 is bolted to a differential housing 22 by bolts 24 (only one shown).

A double cardan universal joint 26 is located across the pivot axis of the kingpin assemblies 18 and 20 and includes a hollow stub shaft 28 at its yoke end which extends into a suitable opening provided in the yoke and also a hollow stub shaft 30 at its knuckle end which extends into a suitable opening provided in the knuckle 16. The hollow stub shaft 28 is rotatably mounted in the opening provided in the knuckle 14 by a bushing 32.

A drive shaft 34 extends through the housing 12 and has its inner end extending into the differential housing 22 and has its extreme inner end splined to a bevel gear 36 which is part of a limited slip differential indicated generally at 38. The outer end of the shaft 34 extends into the opening in the yoke 14 and into the hollow stub shaft 28 where it has a splined connection with the stub shaft 28.

A sun shaft 40 extends into and is splined to the hollow stub shaft 30 and has an integral sun gear 42 on its outer end which drives a planetary gear set indicated generally at 44. The planetary gear set 44 drives a wheel hub 46 which is rotatably mounted on the knuckle 16 by bearings 48. The stub shaft 30 and sun shaft 40 extend into and through a special seal arrangement indicated generally at 50 which is capable of withstanding both rotary and reciprocating motion. The special seal arrangement 50, wheel hub 46, planetary gear set 44 and sun shaft 42 do not form part of the present invention and are fully described in the aforementioned U.S. Pat. No. 4,693,699 which is expressly incorporated herein by reference for a full description of the same.

With the structure thus far described, the U-joint 26 is free to float on the two shafts 34 and 40, a situation which would be intolerable since the U-joint could move off the axis of rotation of the king pins 18 and 20. To prevent this floating, the hollow stub shaft 28 is secured to the drive shaft 34 by snap ring 52 which is engaged in internal and external grooves provided in the hollow stub shaft 28 and the drive shaft 34, respectively. In turn, the drive shaft 34 is held in a fixed axial position with respect to the housing 12 by a retainer structure which includes a retainer ring 54, a spacer 56, an internal shoulder 58 provided on the housing 12, a shoulder 60 provided on the shaft 34 and retainer screws indicated generally at 62. The retainer ring 54 is rotatably mounted on the shaft 34 and between the shoulder 60 and the spacer 56 which is positioned between the retainer ring 54 and the hollow stub shaft 28. The retainer ring 54 is made of a sintered iron which provides a good bearing material and the spacer ring 56 is tanged or keyed to the stub shaft 28 as at 64 so that all relative rotation between the retainer ring 54 and hollow stub shaft 28 takes place at the interface between the retainer ring 54 and spacer ring 56. The spacer ring 56 is hardened so that with the combination of the hard material and the sintered iron which provides a good bearing surface, very little wear occurs.

The retaining ring 54 is provided with a plurality of partial spherical-shaped slots 66 which provide curved ramp surfaces. The housing 12 is provided with a plurality of tapped, through openings which align with the ramped surfaces. The retainer screws 62 are each of two parts and include a ball 70 positioned in the tapped openings 68 and a set screw 72 threaded into the opening. By tightening the set screw 72, the balls 70 are forced against the ramps or partially spherical slots to force the retainer ring 54 against the shoulder 58 in the housing 12.

The retainer structure described above positively prevents axial movement of the shaft 34 relative to the axle housing 12 with the only looseness coming from tolerances in the single snap ring 52 and its respective grooves and the fit between the spacer ring 56 and the retainer ring 54 and hollow stub shaft 28. This limits axial movement of the shaft 34 and hollow stub shaft 28 to a very small amount so that a simple rotary seal 74 can be used between the hollow stub shaft 28 and the yoke 14. Thus, as the angle between the drive shaft 34 and sun shaft 40 changes due to pivotal movement of the knuckle 16 on the yoke 14, the plunge caused by the change in effective length of the U-joint 26 must be dissipated by axial movement of sun shaft 40 or relative movement between the sun shaft 40 and hollow stub shaft 30. As explained in the aforementioned U.S. Pat. No. 4,693,699, the special seal 50 can survive this axial movement caused by plunge as well as the rotary movement of the shafts. By preventing axial movement of the shaft 34, the plunge caused by the universal joint 26 cannot affect the frictional forces on the limited slip differential and thus will not affect the action of the limited slip differential.

Referring now to FIG. 4, an alternate embodiment of the invention is shown. In the alternate embodiment, the set screw 72 and balls 70 are replaced by set screw 74 having a rounded end 76. The rounded inner end 76 of the set screw 74 serves the same purpose as the ball 70 in the first embodiment, but has the advantage in that no special precautions have to be taken to remove the balls in the event of disassembly.

Having thus described two preferred embodiments of the invention in the context of a preferred use, various modifications within the spirit and scope of the invention will become obvious to those skilled in the art and can be made without departing from the underlying principles of the invention. Therefore, the invention should not be limited to the specific illustrated and described embodiments, but only by the following claims.

I claim:

1. In the combination of an axle housing and an axle shaft within the housing, means for preventing axial movement of the shaft relative to the housing comprising:

an annular shoulder formed on the internal surface of the housing;

one or more threaded bores extending through the housing near the annular shoulder;

an axle shaft retainer ring rotatably mounted on the shaft;

means preventing axial movement of the shaft relative to the ring;

the ring having first and second distal ends with the first thereof in engagement with the annular shoulder and the second thereof having a ramp surface; and set screw means extending through said threaded bores and engaging the ramp surface to cam said ring against said shoulder.

2. The combination as set forth in claim 1 wherein the ramp surface on the second distal end of the retainer ring is formed by one or more slots in the ring.

3. The combination as set forth in claim 2 wherein each slot has a surface shaped as a portion of a sphere, the set screw means includes a ball engaging each slot and a screw threaded into the bore and engaging the ball.

4. The combination as set forth in claim 2 wherein each slot has a surface shaped as a portion of a sphere and an inner end of each set screw means is semispherical in shape.

5. The combination as set forth in claim 1 wherein the means preventing axial movement of the shaft relative to the retainer ring includes a shoulder on the shaft in engagement with the first distal end of the ring, a sleeve on the shaft in engagement with the second distal end of the ring and a split ring engaged in external and internal annular grooves in the shaft and sleeve, respectively.

6. In an axle for a steerable driven wheel, the axle including an axle housing having a yoke at one end and a knuckle pivotably mounted to the yoke by king pin means for movement about a pivot axis of the king pin means, an axle shaft extending through the housing, a universal joint connected to the axle shaft to transmit rotation across the pivot axis of the king pin means, the universal joint having a yoke end terminating in a hollow stub shaft splined to the axle shaft, and a split ring engaged in external and internal annular grooves in the axle shaft and hollow stub shaft, respectively, to prevent axial relative movement between the axle shaft and stub shaft, the improvement residing in means to prevent relative axial movement between the axle shaft and axial housing comprising:

an annular shoulder formed on an internal surface of the axle housing and facing the yoke end of the housing;

one or more threaded bores extending through the axle housing between the annular shoulder and yoke end and near the annular shoulder;

an annular shoulder formed on the axle shaft and facing the stub shaft;

an axle shaft retainer ring rotatably mounted on the axle shaft and trapped between the shoulder on the axle shaft and the stub shaft to prevent axial movement of the axle shaft retainer ring on the axle shaft;

the axle shaft retainer ring having a first end in engagement with the shoulders provided on the axle housing and axle shaft and a second end having a ramp surface; and set screw means extending through said one or more threaded bores and engaging said ramp surface to cam said axle shaft retainer ring against said housing shoulder.

7. The combination as set forth in claim 6 wherein said axle shaft retainer ring is of sintered iron construction, a hardened ring is interposed between the axle shaft retainer ring and the stub shaft and tanged to the stub shaft whereby relative rotary movement between the axle shaft and axle shaft retainer ring occurs at the axle shaft shoulder and hardened ring.

8. The combination as set forth in claim 6 wherein the ramp surface is provided by one or more slots formed in the second end of the axle shaft retainer ring.

9. The combination as set forth in claim 8 wherein each slot has a surface shaped as a portion of a sphere, the set screw means includes a ball engaging each slot and a screw threaded into the bore and engaging the ball.

10. The combination as set forth in claim 8 wherein each slot has a surface shaped as a portion of a sphere and an inner end of each set screw means is semi-spherical in shape.

11. The combination as set forth in claim 10 wherein said shaft retainer ring is of sintered iron construction, a hardened ring is interposed between the axle shaft retainer ring and the stub shaft and tanged to the stub shaft whereby relative rotary movement between the axle shaft and the axle shaft retainer ring occurs at the axle shaft shoulder and hardened ring.

* * * * *